March 29, 1949.   H. S. HOFFAR   2,465,726
JOINT FOR IMPACT TOOLS

Filed Oct. 10, 1945   2 Sheets-Sheet 1

*INVENTOR.*
HENRY S. HOFFAR
BY
Kwis, Hudson, Boughton & Williams
ATTORNEYS

March 29, 1949.  H. S. HOFFAR  2,465,726
JOINT FOR IMPACT TOOLS
Filed Oct. 10, 1945  2 Sheets-Sheet 2

*INVENTOR.*
HENRY S. HOFFAR
BY
Kwis, Hudson, Boughton & Williams
ATTORNEYS

Patented Mar. 29, 1949

2,465,726

UNITED STATES PATENT OFFICE 2,465,726

JOINT FOR IMPACT TOOLS

Henry S. Hoffar, Vancouver, British Columbia, Canada, assignor, by mesne assignments, to Le Roi Company, Milwaukee, Wis., a corporation of Wisconsin Application October 10, 1945, Serial No. 621,456

4 Claims. (Cl. 287—103)

This invention relates to improvements in joints for impact tools, more particularly joints for rock drills of the type in which the drill bit is demountable from the drill shank. The present application is a continuation-in-part of my copending application Serial No. 474,525, filed February 3, 1943, now abandoned.

One of the objects of the invention is the provision of a joint construction which is not subject to accidental disconnection and yet one which is readily connected and disconnected when it is desired to remove a drill bit for sharpening or other servicing and to replace the same.

Another object is the provision of a joint of the character stated in the construction of which the necessary machining operations are of a simple nature.

Other objects and features of novelty will appear as I proceed with the description of those embodiments of the invention which, for the purposes of the present application, I have illustrated in the accompanying drawings, in which Fig. 1 is a lengthwise view of the shank portion of a rock drill designed to receive a demountable drill bit.

Figure 1:
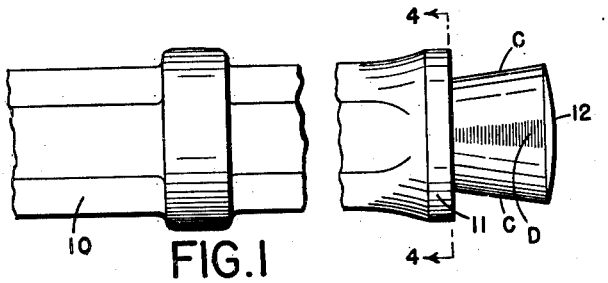
Figure 3:
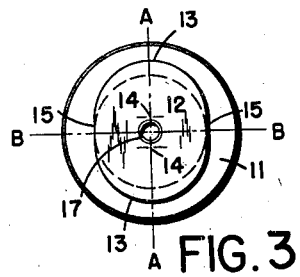
Fig. 3 is an end view of Fig. 1.
Figure 2:
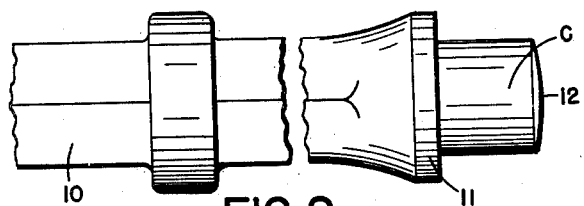
Fig. 2 is a similar view with the shank rotated through an angle of 90°.
Figure 4:
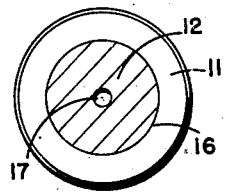
Fig. 4 is a cross-sectional view taken substantially on line 4—4 of Fig. 1.

In the drawings 10 represents the shank of a rock drill provided with an annular shoulder 11 beyond which projects a tip 12. This tip is circular at the base, as indicated in Fig. 4. At its outer end, as indicated in Fig. 3, its cross-sectional form is oval, but more specifically stated the oval is made up of substantially circular arcs 13 with spaced centers 14, these arcs being connected along the sides of the tip by arcs 15 of circles of long radii. Between the base circle 16 and the oval extremity 13, 15, 13, 15, the tip is finished with frusto-conical surfaces C having axes at right angles to the shoulder 11 extending through the points 14, each of these conical surfaces being disposed in the region of the major plane of symmetry A—A of the tip. The side surfaces D of the tip, which are divided equally by the minor plane of symmetry B—B, are cylindrical, and the distance between the arcs 15 where they cross the plane B—B is equal to the diameter of the circle 16. The demarcation lines between the conical surfaces and the cylindrical surfaces are not readily apparent upon casual inspection of the joint, but the faintly discernible lines of demarcation on each side of the tip approach each other towards the base 11, making the cylindrical surfaces D on each side substantially triangular with the base of the triangle at the outer end of the tip and the point at the base of the tip.

The tip 12 is preferably formed by first turning down the end portion of the shank to a frusto-conical form with a slope somewhat less than that of the surfaces C of the finished article. Thereafter the tip is subjected to a forging operation which presses together two opposed sides of the tip until its dimension along the line 15—15 equals that across the base of the tip, thereby forming two triangular portions D and bringing them into parallelism approximately. The usual waterway through the center of the shank and tip is illustrated at 17.

Figure 5:
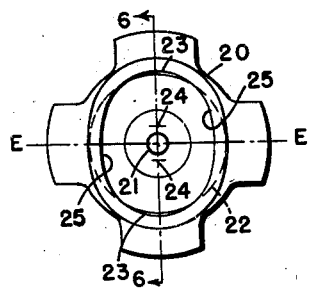
Fig. 5 is a view of the drill bit looking into the socket formed in the bit.
Figure 6:
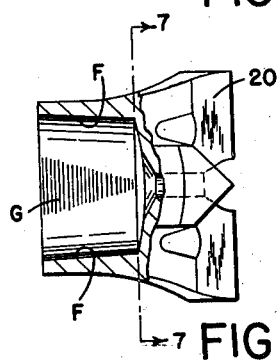
Fig. 6 is a view of the drill bit partially in section on the line 6—6 of Fig. 5.
Figure 8:
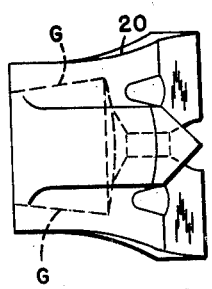
Fig. 8 is an elevational view of the drill bit turned through an angle of 90° from the position illustrated in Fig. 6.
Figure 7:
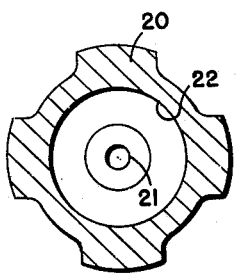
Fig. 7 is a cross-sectional view taken substantially on the line 7—7 of Fig. 6.

The demountable bit is indicated generally by the reference numeral 20. It may be of conventional form as to the cutting edges, and has a short waterway 21 that comes into line with the waterway 17 when the parts are assembled. It has a tip receiving socket which is circular at its inner end as indicated by the line 22, and is oval at its outer end. However, as shown in Fig. 5, the internal perimeter of the socket at the outer end of the bit may be more specifically described as comprising two equal circular arcs 23 of relatively short radius centered at the points 24, and two circular arcs 25 of relatively long radius. The walls of the socket between the circle 22 and the oval 23, 25, 23, 25, are graduated, so that there is a slight flare in the socket at and adjacent the major plane of symmetry along the section line 6—6, and a reverse slope along and adjacent the minor plane of symmetry marked E—E in Fig. 5. The outwardly flaring surfaces are designated F, while the outwardly converging surfaces between the circle 22 and the arcs 25 are designated G, see particularly Fig. 8. The surfaces G are also substantially triangular in shape as indicated in Fig. 6. These surfaces may be substantially flat although preferably they are slightly arcuate in cross-section in order to more smoothly merge with the flaring surfaces in the region of the major plane of symmetry. The dimension across the mouth of the socket along the section line 6—6 is therefore slightly greater than the diameter of the circle 22 at the base of the socket, while the dimension across the mouth along the line E—E is somewhat shorter than the diameter of circle 22.

Although in some aspects of the invention the method of forming the socket in the bit, like that of forming the shank tip, may be any method which will attain the desired result, I prefer to form it by drilling a hole in the bit of the diameter of circle 22, and then by a forging operation I press toward each other two opposed walls of the socket, applying the pressure primarily to the walls at the outer end of the socket. The outward flare of the surfaces F is a concomitant of this procedure but has some advantage in that it facilitates the entry of the tip into the socket during assembly of the parts.

Figure 13:
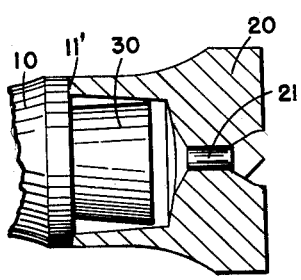
Fig. 13 is a view like Fig. 9, but on a smaller scale, of a modification in which the shank tip is somewhat shorter than in the form of Figs. 1 to 12.

The modification illustrated in Fig. 13 is like the previously described form of the invention, except that the tip 30 is shorter than the tip 12 and never bears against the base of the socket. In this case the shock of drilling is taken on the shoulder 11' exclusively, whereas in the first described form of the invention it is taken partly on the shoulder 11 and partly on the extremity of the tip which engages the base of the socket.

It will be apparent that the joint of the present invention lends itself to economical production, since if the preferred method of making both the shank tip and the bit socket previously explained is followed, the machining of the parts is limited to simple turning operations, and the remaining forging operations are also relatively simple.

Figure 9:
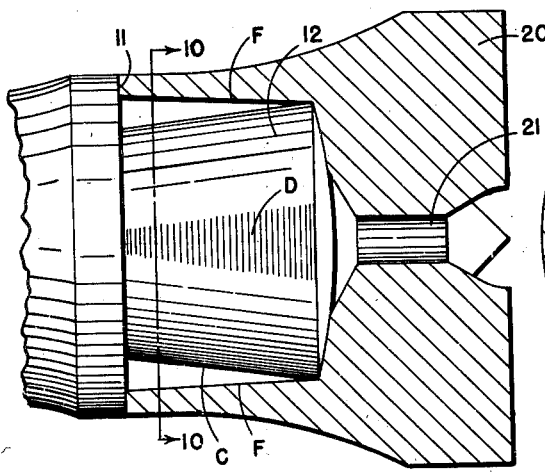
Fig. 9 is a view partly in central longitudinal section of a drill shank and bit in the relative angular positions which they occupy when the shank tip is first inserted into the socket of the drill bit, the view being taken substantially on the plane indicated by the line 9—9 of Fig. 10.
Figure 10:
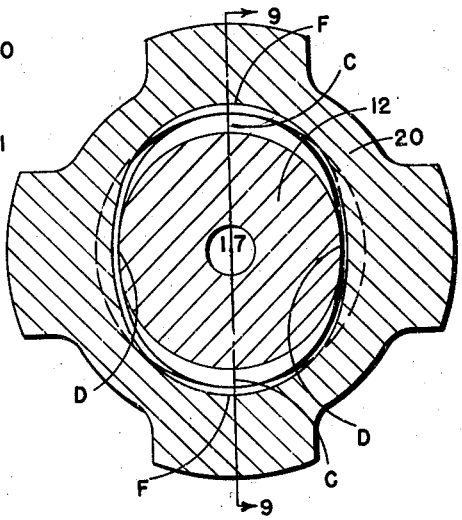
Fig. 10 is a cross-sectional view taken substantially on the line 10—10 of Fig. 9.
Figure 11:
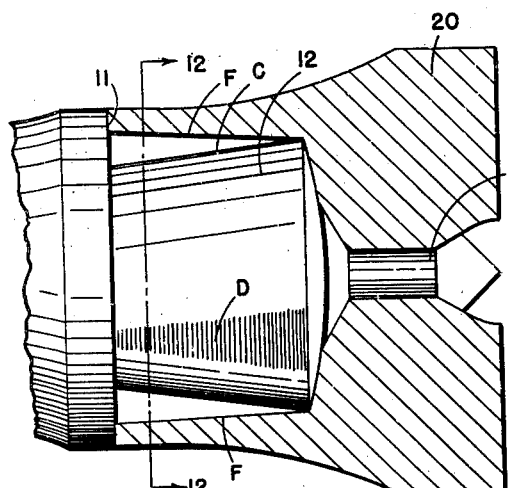
Fig. 11 is a view similar to Fig. 9 but with the shank turned relative to the bit through an angle of approximately 30° into position to lock the two members together.
Figure 12:
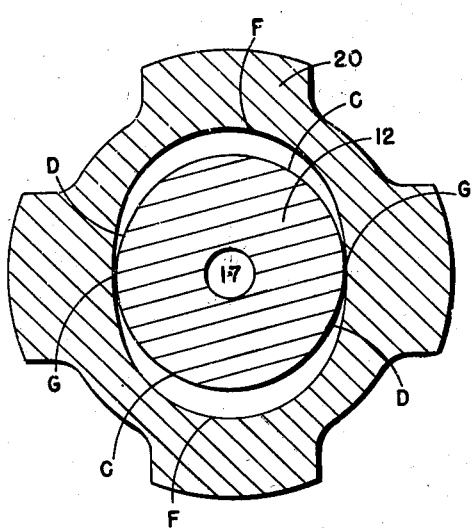
Fig. 12 is a cross-sectional view taken substantially on the line 12—12 of Fig. 11.

When the joint is to be assembled the operator lines up the major axis A—A of the tip with the major axis along the section line 6—6 of the bit and then pushes these two members toward each other until the end of the bit seats upon the base of the socket and the annular shoulder 11 engages the outer end of the bit surrounding the socket therein. The operator then turns the bit with respect to the shank, or vice versa, until they bind firmly on each other. The necessary amount of angular movement in the illustrated case approximates 30°. Because of the elongation of the tip at its outer end and the compression of the socket at its outer end this relative rotation causes the two members to frictionally engage each other, and because of the tapering form of the tip along its major plane of symmetry and the converging walls of the socket along its minor plane of symmetry, the rotation also causes frictional engagement preventing relative longitudinal movement between the two members. In other words the relative rotation results in a longitudinal as well as a rotational locking action. Rotation for locking may be in either direction from the position illustrated in Figs. 9 and 10. In this action the conical surfaces C of the tip swing in beneath the converging surfaces G of the socket, camming one against the other and drawing them toward each other lengthwise of the drill, so that they are locked against relative longitudinal movement and the bearing between the bit and the shank is made firm both at the shoulder 11 and at the base of the socket. In the case of the Fig. 13 construction this bearing of course is at the shoulder 11' exclusively.

In the foregoing description I have necessarily gone somewhat into detail in order to explain fully the particular embodiments of the invention herein illustrated, but I desire it to be understood that such detailed disclosures are not to be construed as amounting to limitations, except as they may be included in the appended claims.

Having thus described my invention, I claim:

1. In a joint of the character described, a tip element and a socket element, said tip element being circular in cross-section at its base and gradually merging into oval cross-section at its extremity, the socket of said socket element being circular at its base with a diameter as great as the longer dimension of said oval extremity, and having opposed walls converging toward the rim of the socket to provide an oval mouth with a short dimension less than the long dimension of the tip extremity, the circular and oval portions of said socket gradually merging into each other, whereby said elements are cammed toward each other longitudinally and locked together by relative rotation through an angle of less than 90°.

2. In a joint of the character described, a tip element and a socket element, said tip element being circular in cross-section at its base and gradually merging into oval cross-section at its extremity, the socket of said socket element being circular at its base with a diameter as great as the longer dimension of said oval extremity, and having opposed walls converging toward the rim of the socket to provide an oval mouth with a short dimension less than the long dimension of the tip extremity, the circular and oval portions of said socket gradually merging into each other, and a shoulder at the base of said tip element adapted to contact the rim of said socket element and tightly engage the same when said elements are rotated relatively through an angle of less than 90°, and are thereby cammed toward each other longitudinally and locked together.

3. In a joint of the character described, a symmetrical tip element and a symmetrical socket element, said tip element being circular in cross-section at its base and oval at its extremity and being tapered away from its extremity in the region of its major plane of symmetry, the socket of said socket element being circular at its base with a diameter as great as the longer dimension of said oval extremity, and having opposed walls converging toward the rim of the socket to provide an oval mouth with a short dimension less than the long dimension of the tip extremity, the cross-sections of both the tip and socket elements merging gradually from circular to oval, whereby said elements when rotated relatively in either direction through an angle of less than 90° are cammed toward each other longitudinally and locked together.

4. In a joint of the character described, a tip element having major and minor planes of symmetry, being circular in cross-section at its base, oval at its extremity and tapered away from its extremity in the region of its major plane of symmetry while the walls in the region of its minor plane of symmetry are approximately parallel, a socket element having major and minor planes of symmetry, the socket of said socket element being circular in cross-section at its base with a diameter at least as great as the long dimension of said tip extremity, and having in the region of its minor plane of symmetry opposed walls converging toward the rim of the socket to provide an oval mouth with a short dimension less than the long dimension of the tip extremity, the cross-sections of both the tip and socket elements merging gradually from circular to oval, whereby said elements when rotated relatively in either direction through an angle of less than 90° are cammed toward each other longitudinally and locked together.

HENRY S. HOFFAR.

REFERENCES CITED

The following references are of record in the file of this patent:

UNITED STATES PATENTS

| Number | Name | Date |
| --- | --- | --- |
| 638,564 | Davies | Dec. 5, 1899 |
| 917,349 | Opsal | Apr. 6, 1909 |
| 1,950,947 | Mulroyan | Mar. 13, 1934 |
| 2,122,244 | Brown | June 28, 1938 |
| 2,234,486 | Craig | Mar. 11, 1941 |
| 2,281,973 | Healy | May 5, 1942 |

FOREIGN PATENTS

| Number | Country | Date |
| --- | --- | --- |
| 108,281 | Great Britain | Aug. 2, 1917 |